June 12, 1934.  G. PIELSTICK  1,962,523
INTERNAL COMBUSTION ENGINE
Filed Dec. 8, 1930
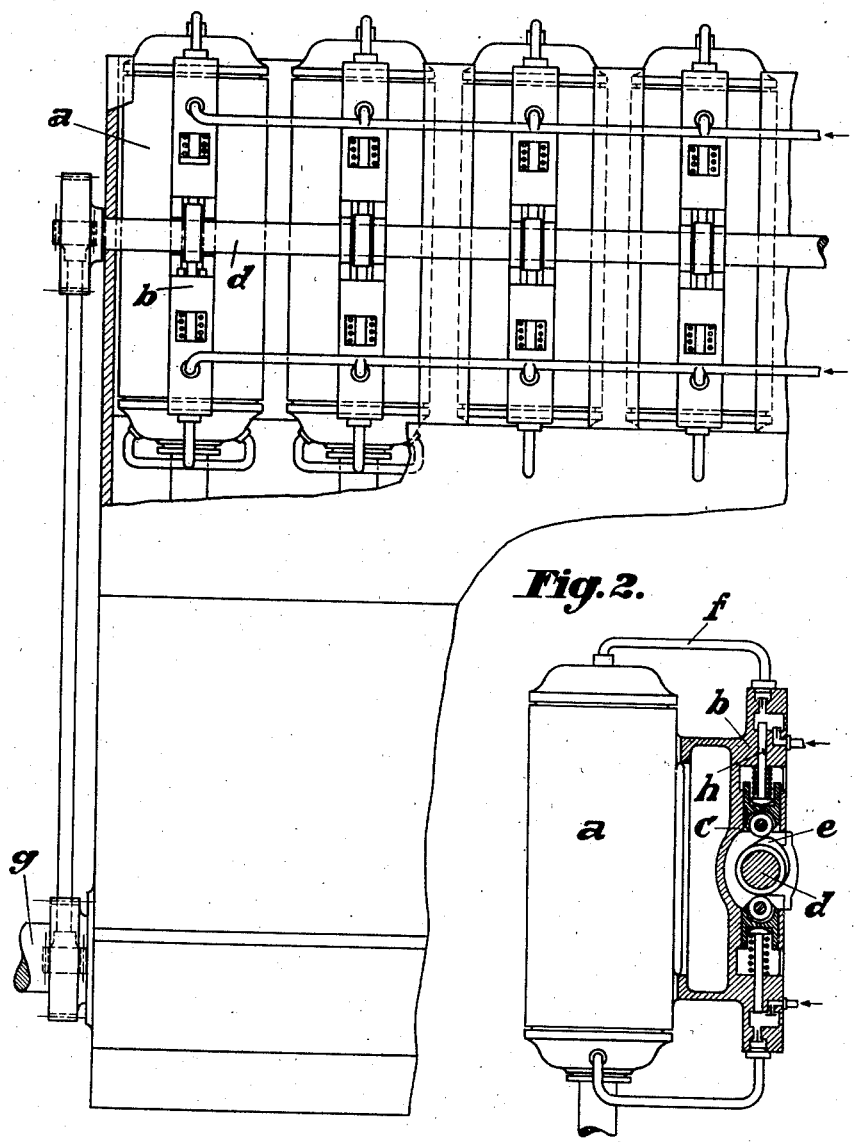

Patented June 12, 1934

1,962,523

UNITED STATES PATENT OFFICE 1,962,523

INTERNAL COMBUSTION ENGINE

Gustav Pielstick, Augsburg, Germany, assignor to Maschinenfabrik Augsburg-Nurnberg A. G., Augsburg, Germany, a corporation of Germany Application December 8, 1930, Serial No. 500,749
In Germany December 7, 1929

1 Claim. (Cl. 123—61)

(Granted under the provisions of sec. 14, act of March 2, 1927; 357 O. G. 5)

This invention relates to internal combustion engines, and more particularly to the arrangement of fuel pumps in double acting engines.

The principal object of the invention is the provision of a double acting engine operating with stream atomization of the fuel, having a symmetrical arrangement of fuel pumps operated by a common drive means and providing for fuel pipes of very short length to the engine cylinders.

Other objects and advantages of the invention will be apparent from the following description, the appended claim, and the accompanying drawing, in which—

Fig. 1 is a front elevation, partly in section, of a multi-cylinder double acting engine embodying the present invention; and Fig. 2 is a side view, shown partly in section, of the cylinder and pump arrangement.

Referring more particularly to the drawing by reference numerals, $a$ designates the several cylinders of a double acting engine, operating with solid injection of the fuel. Any suitable number of cylinders may be provided, Fig. 1 showing four pairs or sets of opposed cylinders. The fuel is injected into the cylinders by means of fuel pumps $b$. Two pumps are provided for each set of opposed cylinders, both pumps being contained in a common housing $c$ secured to the respective cylinder set so that each pump is symmetrically arranged with relation to a common cam shaft $d$ which extends centrally of the row of cylinders and at one side thereof, as shown. A common cam $e$ operates the two plungers $h$ of the two adjacent symmetrically arranged pumps in a pump housing.

Each pump is connected at its outer end by a fuel lead or pipe $f$ to an injection nozzle in the adjacent cylinder end, these pipes being quite short and all of equal dimensions and of symmetrical construction so that they may be interchangeable. The drive of the cam shaft $d$ is taken from the crank shaft $g$ of the engine in any suitable manner.

In accordance with this arrangement of the fuel pumps, combustion power machines are provided with unusually short pipes leading from the fuel pumps to the injection nozzles, and the high injection pressures that obtain during operation are not likely to burst the pipes. These high injection pressures are necessary in the operation of high speed engines. In such engines successive injections follow one another only fractional parts of a second apart. Consider for example a two-cycle engine operating at 1000 R. P. M.—in each second there are approximately sixteen injections taking place, and the high injection pressures of 250 or 300 atmospheres cause great strains upon the injection leads or pipes, particularly if they must withstand pressure differences of from 0 to 300 atmospheres in quick succession. Very short pipes or leads will meet these requirements, but with longer pipe lengths it has been found that the danger of bursting is greatly increased. Therefore, in accordance with this invention, a common drive for the several pumps of the multi-cylinder engine is provided, each pump being closely adjacent its respective cylinder. The common cam shaft drive and the fuel pump arrangement described provide a construction which is quite simple, light in weight, and having a minimum of parts.

While the form of apparatus herein described constitutes a preferred embodiment of the invention, it is to be understood that the invention is not limited to this precise form of apparatus, and that changes may be made therein without departing from the scope of the invention which is defined in the appended claim.

What is claimed is:

A double acting combustion engine operating with solid injection of the fuel to be supplied at a pressure of the order of 250–300 atmospheres, comprising a series of opposed cylinders, a fuel pump housing attached to each pair of opposed cylinders, a pair of opposed liquid fuel pumps in each housing, a cam shaft driven from the engine crank shaft for operating all of said fuel pumps the said cam shaft being supported adjacent one side of the cylinders and extending therealong substantially midway of their length, a cam on said shaft for operating each pair of fuel pumps, the pumps of each pair being symmetrically arranged on diametrically opposite sides of the cam shaft with the discharge end of each pump positioned adjacent the outer end of a cylinder, and short fuel pipes substantially equal in length connecting the fuel pumps to the adjacent cylinders to which they are attached.

GUSTAV PIELSTICK.